United States Patent [19]

Bertrand et al.

[11] 4,195,337

[45] Mar. 25, 1980

[54] CONTROL METHOD UTILIZING A MODEL CONTROL SCHEME

[75] Inventors: Pierre Bertrand, Plessis Robinson; Michel Jamet, Nantes; Jacques Strub, Les Ulis; Eric Walter, Cachan, all of France

[73] Assignee: Agence Nationale de Valorisation de la Recherche (Anvar), Neuilly sur Seine, France

[21] Appl. No.: 909,063

[22] Filed: May 24, 1978

[30] Foreign Application Priority Data

May 26, 1977 [FR] France .................. 77 16114

[51] Int. Cl.² .............. G05B 13/02; G05B 17/02; G06G 7/66
[52] U.S. Cl. ................. 364/106; 318/561; 318/610; 364/118
[58] Field of Search ............. 364/105, 106, 118, 553, 364/801, 802; 318/561, 610, 609

[56] References Cited

U.S. PATENT DOCUMENTS

| 3,221,238 | 11/1965 | Unger et al. | 364/106 |
| 3,795,799 | 3/1974 | Courtiol | 364/106 |
| 3,920,965 | 11/1975 | Sohrwardy | 364/106 |

FOREIGN PATENT DOCUMENTS

| 1195194 | 6/1970 | United Kingdom | 318/561 |
| 1442040 | 7/1976 | United Kingdom | 364/106 |

*Primary Examiner*—Joseph F. Ruggiero
*Attorney, Agent, or Firm*—Cushman, Darby & Cushman

[57] ABSTRACT

A control method is described in which, a plant, a reference model and a corrector are serially connected in the loop. The plant output is fed back and compared against a reference signal to develop an error signal. The reference mode operates upon the error signal with a predetermined transfer function to develop signals proportional to the error signal and various successive order derivatives of the error signal. The model output signals are applied to a corrector circuit which multiplies the respective model output signals by appropriate coefficients, and sums the resultant product signals to produce control signals for the plant. Provisions are also disclosed for varying the coefficients to provide self-adaptive control. Provisions for accommodating process delays are also provided.

14 Claims, 8 Drawing Figures

CONTROL METHOD UTILIZING A MODEL CONTROL SCHEME

BACKGROUND OF THE INVENTION

The present invention relates generally to a self-adaptative control method and a self-adaptative controller implementing said method.

Generally, a controller or regulator is a device operating on one input of a plant for insuring that an output state of said plant is in conformity with a preset fixed or variable value usually called set point. In the field of regulation, "plant" designates a set of active devices comprising actuating means or actuators capable of modifying the characteristics of said devices and parameter sensing means or sensors providing an indication of the state of some parameters. Accordingly, the output of a plant will be the output of a sensor measuring one of the parameters of this plant (or process).

For example, considering an oven which has to be maintained at a constant temperature, the plant will comprise the oven and its content, the heat supply source of the oven, a temperature sensing means for this oven providing an electric signal in correspondence with the temperature and, for example, a servo-valve for regulating a fuel flow aimed to heat the oven. The output of the plant is accordingly the electrical signal indicating the temperature of the oven and input of the plant is an electrical signal capable of controlling the servo-valve.

A conventional control scheme is indicated in the attached FIG. 1. An output value 1 of the plant P (for example the oven temperature signal in the above example) is compared in a comparator 2 with a set point signal 3. The resulting error signal sent to a controller R which provides a control signal at the input of the plant (that is the servo-valve in the above example).

The most common controllers are the controllers called PID (proportional, integral, derivative) which have a transfer function of the following type:

$$R(p) = \frac{1}{1 + Tp} \left[ A + \frac{B}{p} + \frac{Cp}{1 + \tau p} \right] \quad (1)$$

In equation (1), the first term between the brackets represents the proportional action, the second one the integral action and the third one the derivative action (p represents the Laplace transform operator). In a simplified way, one can consider that, in the control, the proportional action reduces the stationary error when the gain increases, and increases also the rapidity of the control. However, if the gain increases too much, this can cause oscillations. Accordingly, the integral action is included to eliminate the stationary error and increases the control rapidity. The derivative action, due to its anticipation action (phase advance) provides a stabilization effect.

Therefore, it is necessary to adjust the parameters A, B, C of equation (1) for providing an optimum regulation. However, in practice, two difficulties are encountered. First, the various adjustments are generally not independent and in particular the adjustments of the integral and derivative actions are generally correlated. Second, the derivative action, requires the filtering out of noise which decreases the efficiency of the derivative action.

Additionally, an operator wishing to adjust the control loop for obtaining an optimum operation, for example by minimizing the response time and/or by limiting the overshoot, must adjust three parameters, (the above parameters A, B and C), which are not directly associated with the parameters to be optimized, that is the response time and the overshoot.

Accordingly, in practice where the transfer function of the plant is unknown, the controller is adjusted by successive approximations until satisfactory adjustment is obtained. However, nothing provides any indication to the operator that the obtained control is, in fact, optimized. In practice, due to the complex relationship between the adjustment of the derivative action and the adjustment of the integral action, the operator generally neglects to use the derivative action. It is accordingly clear that, in the greatest number of the practical cases, the optimum control is far from being attained.

Another important practical problem is that the transfer function of the plant varies in time due to various disturbances. For example, in case of the above example, if the fuel pressure towards the electrovalve varies, the action with respect to this electrovalve will have to vary if a good regulation is to be maintained, that is the various controller parameters will have to be varied during the operation. For example, if we consider that the above oven is a polymerization reactor, during the polymerization reaction, the process which is initially endothermic becomes exothermic. It is accordingly clear that, during the operation, the controller characteristics will have to be modified because the transfer function of the plant changes.

For solving this problem, self-adaptative controllers have been designed in the art.

An adaptative control system is essentially a feedback system which automatically provides a desired response in the presence of important external disturbances and large variations of the controlled system parameters. Usually, this system comprises various devices, some of which measure the dynamic parameters of the control system and others modify the characteristics of the control element in accordance with a comparison of the measurements in order to optimize the "cost" function. In greater detail, an adaptative control system results from three considerations:

(1) definition of a prima facie optimum behaviour, from a cost function or performance index of a prima facie optimum behaviour;
(2) continuous comparison between the desired performances and the obtained performances; and
(3) adjustment of the control system parameters in order to minimize the existing gap measured in the above point 2.

Accordingly, an optimum control system is considered to be an adaptative system in which the performance index is directly measured. Although it is difficult to classify adaptative systems into general classes, one can categorize the systems utilizing : a reference model; the pulse response from test signals or correlation, the optimum control; and various approaches using a digital computer. We shall consider here only the adaptative systems with a reference model which are particularly flexible and exhibit a great number of practical advantages.

An example of model-reference self-adaptative controller according to the prior art is shown in FIG. 2. In this figure, the same reference depict the same elements as in FIG. 1, that is a plant output signal 1, a comparator 2, a set point signal 3, a controller R and a plant P. A reference model 10 also receives the set point signal 3, and the output 11 of this reference model is compared with the output 1 of the plant. The resulting error signal e is applied to the controller R through an adaptation mechanism 12. The adaptation mechanism 12 cooperates with the controller R in order that the unit comprising the controller and the plant has the same transfer function as the model 10, said function being predetermined.

A great number of theories deal with adaptative control mechanism and one can cite, for example, the Whitaker's method commonly called "MIT synthesis rule" which consists in minimizing the integral of the square of the error e between the model and the plant; the second Liapounov method; and methods implementing the hyperstability theory such as the Landau's method.

All those methods, providing adaptation algorithms, are cited here only for indicating that it is known in the art to adapt a controller for modifying its transfer function and adapt same to the variation of the transfer function of a plant due to structural disturbances.

Referring again to the prior art scheme shown in FIG. 2, it should be noted, however, that despite the improvement provided by the reference model and the self-adaptation of the regulator, important drawbacks remain. One can particularly cite the following points:

(1) the controller R must always include differentiators for providing derivative actuating signals of the first, second, third . . . order according to the nature of the process. As noted above, the such differentiators entail associated filtering problems.

(2) FIG. 2 shows that the regulation is satisfactory when the set point signal 3 is variable. However, when the set point signal is constant, the reference model is reduced to a stationary gain and the adaptation of the controller is no long produced even if disturbances are present.

SUMMARY OF THE INVENTION

As a consequence, an object of the invention is to provide a new adaptative control method to overcome the above drawbacks of the prior art devices.

Another object of the invention is to provide a self-adaptative controller implementing the above method.

Another object of the invention is to provide such a controller which deals also with plants presenting a delay time or dead time.

In order to accomplish those objects and others, the instant invention provides a control method wherein the plant is serially connected in a control loop with a model and a corrector circuit having a transfer function inverse from that of the plant. The necessary derivative signals provide by the corrector are obtained from the model outputs and not by differentiation. This control method is particularly suited to be self-adaptive. To this end, the error signal from the comparison of the model output signal and the plant output signal is used. This error signal provides the controller adaptation, through an self-adaptative mechanism implementing an adaptation algorithm known per se.

A first advantage of this method results from the fact that the reference model is serially connected in the regulation loop and not in parallel. Accordingly, the model is constantly receiving a variable signal corresponding at least to the noise signal from the plant output. As a consequence, the model remains constantly excited with information on the model output and its derivatives, in contradistinstion to the parallel structure shown in FIG. 2. Accordingly, the adaptation can operate even when the set point remains fixed.

Additionally, in the particular case when the chosen model is a second order model, the operator has a direct access to the adjustment of the parameters defining the response time and the damping, that is the overshoot of the control chain, for a step input.

Another advantage of the invention is that the corrector does not comprise any differentiating circuit but utilizes signals directly from the reference model.

BRIEF DESCRIPTION OF THE DRAWINGS

Further objects and advantages of the present invention will become more apparent from the following description of the invention when considered in conjunction with the accompanying drawings forming a part thereof wherein:

Referring to FIG. 3, the control scheme according to the invention comprises a control loop wherein a behaviour (reference) model 20 is serially connected with a corrector 21 and a plant P. The plant P has a function of the type $$\frac{k}{1 + a_1 p + a_2 p^2 + \ldots + a_n p^n}$$

where $p, p^2 \ldots p^n$ refer to successive derivatives in accordance with the Laplace transform and includes a delay. The model has a transfer function of an order adapted to the one of the plate and provides proportional, first derivative, second derivative . . . signals. The corrector 21 has a transfer function of the type $k_0 + k_1 p + \ldots + k_n p^n$.

Figure 4:
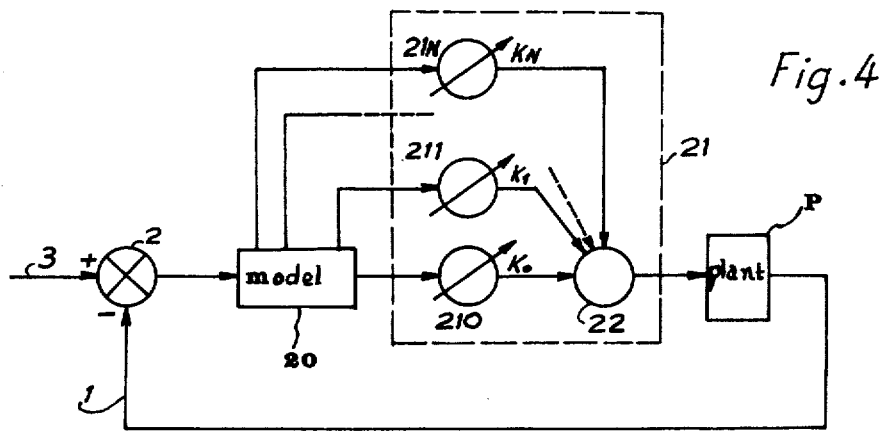
FIG. 4 shows another control loop according to the invention.

FIG. 4 shows a little less schematically the controller according to the invention. The various derivative outputs from the model 20 are multiplied by coefficients $k_0$, $k_1 \ldots k_n$ in multipliers 210, 211, 21n and the output signals from the multipliers are summed in an adder 22.

Figure 1:
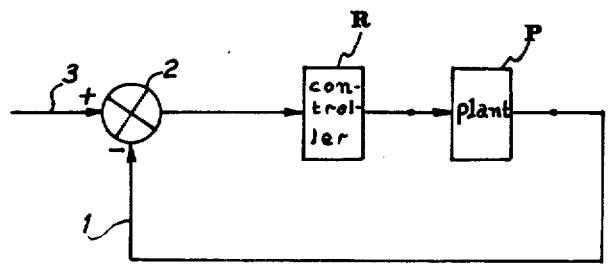
FIG. 1 shows a conventional control loop disclosed above.
Figure 2:
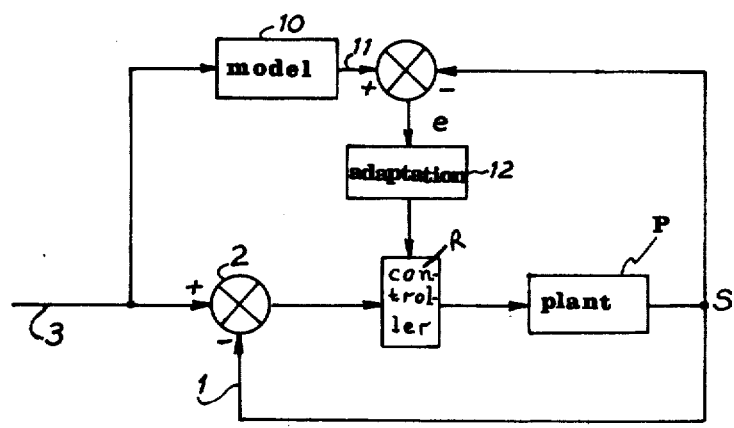
FIG. 2 shows a conventional model-reference self-adaptative control system disclosed above.
Figure 3:
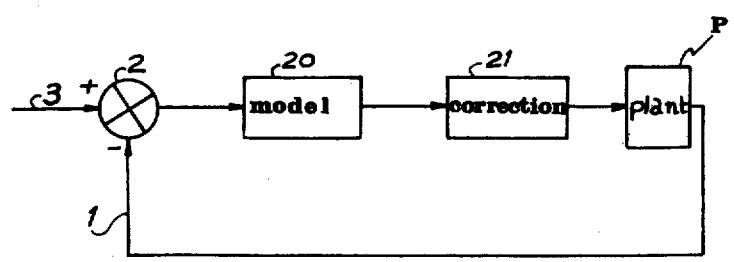
FIG. 3 shows a control loop according to the invention.
Figure 5:
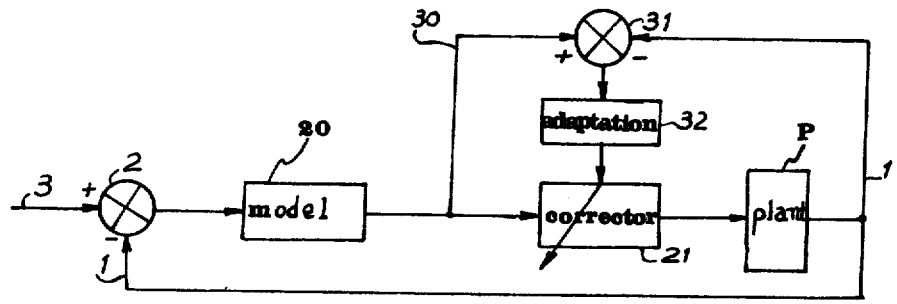
FIG. 5 shows a self-adaptative control loop according to the invention.

FIG. 5 schematically shows an self-adaptative regulator according to the invention. The equivalent representation of FIG. 3 has been used in FIG. 5. The output signal 30 from the model is compared in a comparator (substractor) 31 with the output 1 of the plant P. The resulting error signal controls the corrector 21 through an adaptation device 32.

Figure 6:
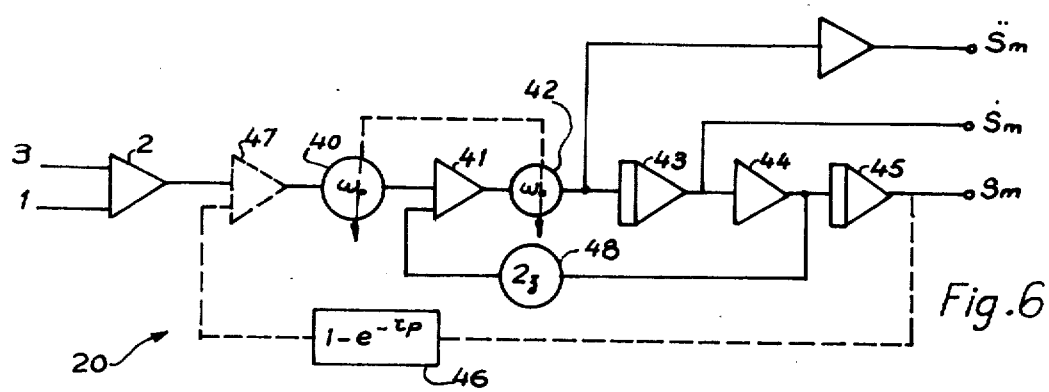
FIG. 6 shows an embodiment of the behaviour model according to any of the FIGS. 3 to 5, in case of a second order process (plant) eventually including a delay.
Figure 7:
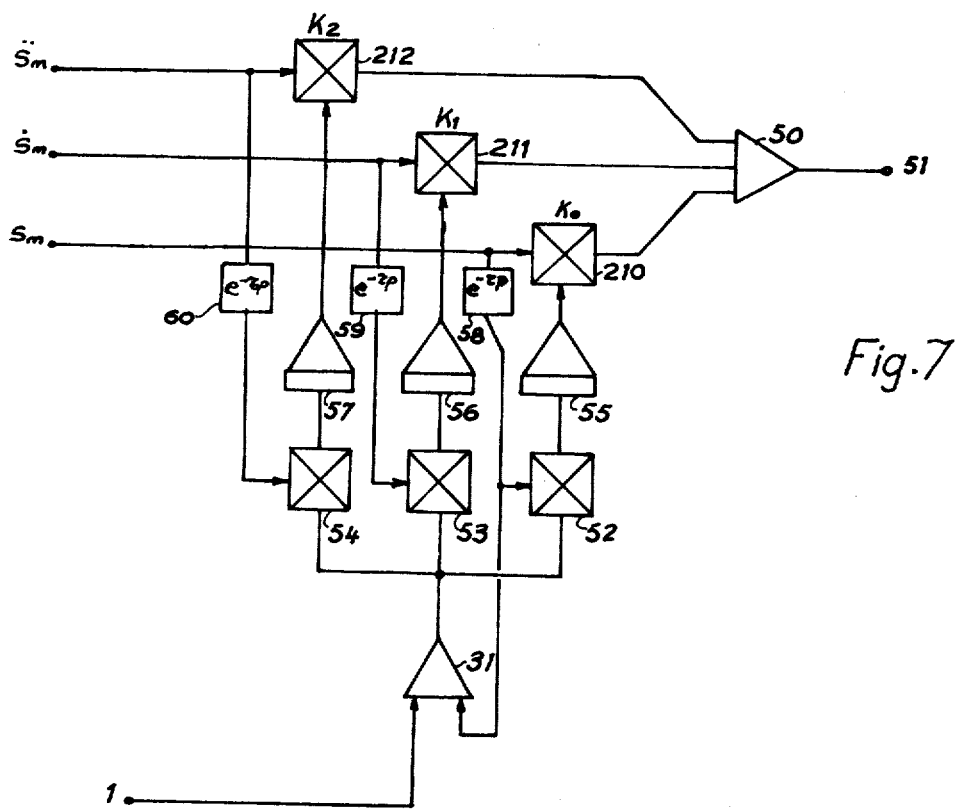
FIG. 7 shows an embodiment of the self-adaptative controller of FIG. 5.
Figure 8:
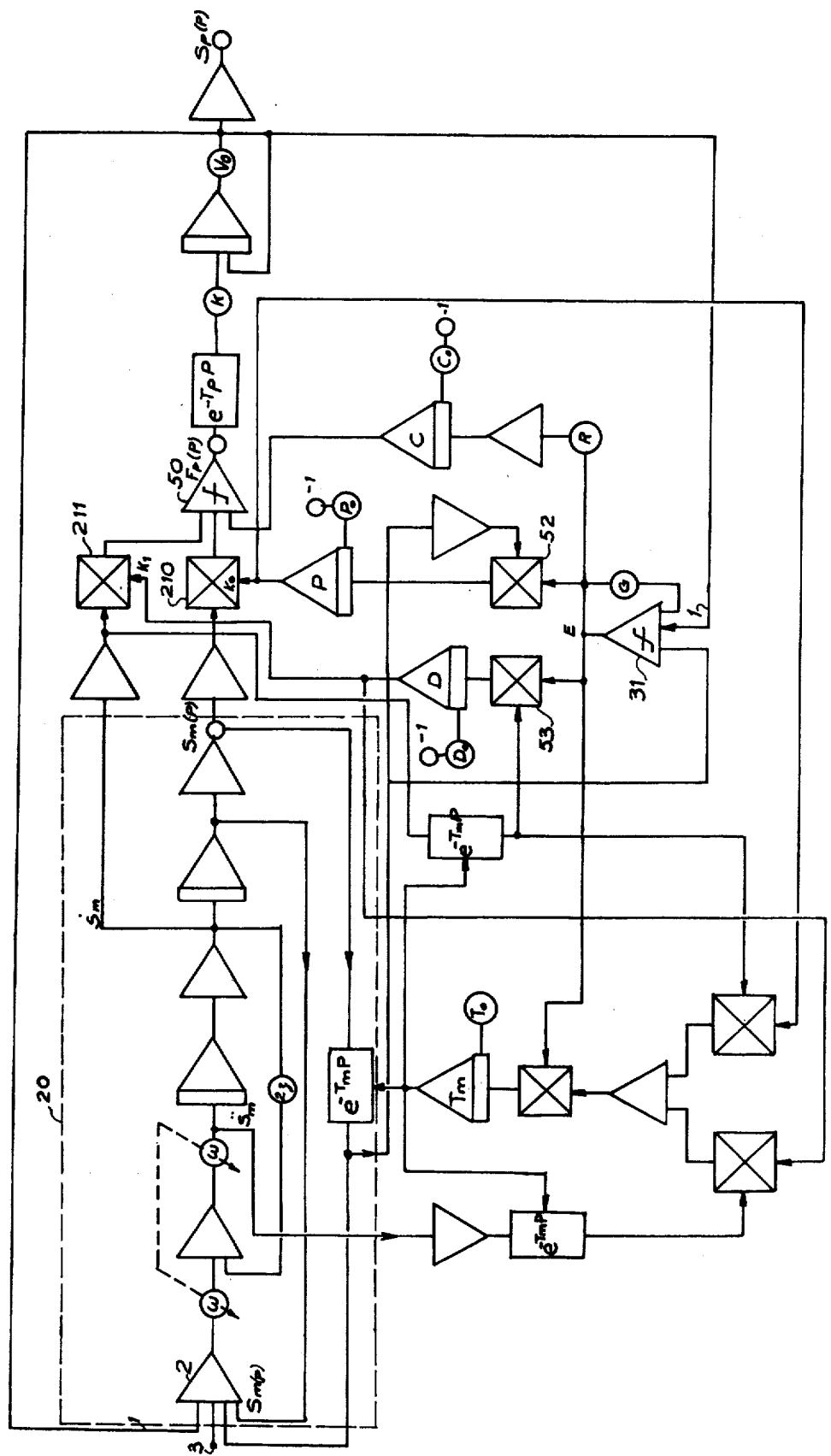
FIG. 8 shows a self-adaptative controller according to the invention for a process including a delay.

This very schematic representation of the invention will be better understood when reading the following description of an embodiment of the behaviour reference model (FIG. 6) and an embodiment of the adaptative corrector (FIG. 7). FIGS. 6 and 8 correspond to the case of a controller to be used with a plant of the second order presenting eventually a delay.

Referring more particularly to FIG. 6, a preferred embodiment of the corrector model 20 comprises the comparator 2 receiving the signal 1 from the plant and the set point signal 3; and successively a first $\omega_o$—multiplier 40, and adder 41, a second $\omega_o$—multiplier 42, the adjustment of which is coupled with the one of the first multiplier 40, a first integrator 43, an inverter 44, and a second integrator 45. One obtains at the end of the chain the signal sm; prior to the second integrator 45 and the inverter 44, a signal $\dot{s}m$ corresponding to the first derivative of sm; and prior to the first integrator 43, a signal $\ddot{s}m$, corresponding to the second order derivative of sm. The output of the amplifier 44 is fed back to the second input of the adder 41 through a 2z-multiplier 48 in order to feed back the signal $2z\dot{s}m$.

If the plant or process to be regulated includes a delay time or dead time $\tau$, an additional feed back circuit of the type $(1-e^{-\tau p}) s_m$ can be inserted between the output sm of the integrator 45 and the input of the model, that is a delay circuit 42 can be connected from the output of the integrator 45 to the second input of an adder 47, the other input of which is connected to the output of the comparator 2.

FIG. 7 shows an embodiment of the corrector 21. This corrector receives the output sm, $\dot{s}m$, $\ddot{s}m$ from the model and multiply same by factors $k_0$, $k_1$, $k_2$ in multipliers 210, 211 and 212 prior to summing same in an adder 50 which provides the control signal 51 of the plant.

In case the corrector is not auto-adaptative, the multipliers $k_0$, $k_1$, and $k_2$ are manually adjustable multipliers. FIG. 7 shows an embodiment of a self-adaptative corrector wherein the coefficients $k_0$, $k_1$ and $k_2$ are automatically provided by an adaptation circuit. This adaptation circuit comprises a comparator 31 (previously schematically shown in FIG. 5) receiving on its first input the output 1 of the plant and on its second output the signal sm. The output error signal from the comparator 31 is provided to three multipliers 52, 53 and 54, the multiplying factors of which are provided by the signals sm, $\dot{s}m$, $\ddot{s}m$ respectively. The output signals from these multipliers provide the factors $k_0$, $k_1$ and $k_2$ through integrators 55, 56, 57. FIG. 7 also shows three delay circuits 58, 59 and 60 necessary to the provision of the gains $k_0$, $k_1$ and $k_2$ in case of a process including a dead time. This delay, which can generally not be compensated, is introduced in the reference model as indicated in FIGS. 6 and 8.

In the above, the model and the corrector have been presented as distinct devices for the sake of the simplicity of the description. It is however clear from the above that, in fact, according to the invention, the model and the corrector form only one single apparatus. The specific embodiment shown in FIGS. 6 and 7 indicates that the present invention relates to a reference model controller which can be self-adaptative and wherein no differentiator is included.

When the controller according to the invention is applied to an unknown plant, experiments have shown that the constants $\omega_0$ and z could be adjusted for providing a satisfactory control for fully arbitrary initial values without causing a blocking or an over-oscillation of the control. However, as regards the dead time, the experiments have shown that it is desirable to choose an approximate initial value of the dead time not presenting an error larger than 100% with respect to the dead time of the plant.

FIGS. 6 and 7 show, as a preferred embodiment, a controller of the second order. It will be noted that a reference model of the second order comprising a delay is satisfactory in the larger number of the practical cases.

The application of the invention to a self-adaptative controller usable together with a plant subject to disturbances has been disclosed in the above.

It will be however noted that the invention presents other applications:

(1) the utilization in connection with a multivariable plant as an self-adaptative controller in mono-variable control loops in order to obtain constant performances irrespective of interactions with other loops.

(2) the utilization as a dynamic identifier of the transfer function by using models of various orders.

(3) the utilization as an apparatus permitting to determine the corrector networks necessary for satisfactorily compensating various apparatus and process.

While, in the preferred embodiments disclosed, a corrector device implementing a particularly simple algorithm has been disclosed for realizing the self-adaptation, other known algorithms could be used without departing from the scope of the invention.

In particular, FIG. 8 shows an embodiment of the invention adapted to the case of a device with a non separable delay by making use of the theory of the Smith's predictor.

This FIG. 8 will not be disclosed in detail here as all the components are shown by usual symbols already defined in the former FIGS. 6 and 7. Some components of FIG. 8 are analogous to components already shown in FIG. 6, that is the behaviour model 20, and in FIG. 7, that is the multipliers 210 and 211, the adder 50, the comparator 31 and the multipliers 52 and 53. The device of FIG. 8 additionally permits a self-adaptation of the dead time.

As a very important dead time, higher than one minute, can exist in industrial processes, the technical implementation of the delay module exhibits specific difficulties. The invention provides, for carrying out a delay of analog signals to digitally convert said signals, to transmit the digital signals through controlled shift registers, then to invertly convert the digital signals to analog signals, providing the delayed signal. The analog/digital and digital/analog converters, can be manufactured according to conventionally CMOS technology. The output of the analog/digital converter is a digital signal varying of more or less 1 bit for each clock top as a function of the variation of the input value with respect to the value at the former clock time. This information is delayed by passing through a stationary shift register, then a digital/analog converter restores the delayed input signal from increments which have been stored in the shift register.

Although preferred embodiments of the invention have been described in detail, it is to be understood that various changes, substitutions and alterations can be made therein without departing from the spirit and scope of the invention as defined by the appended claims.

We claim:

1. A system for controlling a process of the type including:

a plant for effecting said process, said plant being responsive to a control signal applied thereto and generating a plant output signal in accordance with a predetermined transfer function;

error signal generator means, responsive to said plant output signal and a reference signal applied thereto, for generating an error signal indicative of deviations of said plant output signal from said reference signal; and means, responsive to said error signal for generating said control signal to said plant, the improvement wherein:

said means for generating said control signal comprises;

model means, responsive to said error signal, for generating respective proportional, and successive order derivative output signals from said error signal in accordance with a predetermined model transfer function;

corrector means, responsive to the respective model means output signals, for generating, in accordance with a transfer function inverse from the transfer function of said plant, said control signals, said inverse transfer function being of the form $k_0 + k_1 p + k_2 p^2 + \ldots k_n p^n$, where $p, p^2 \ldots p^n$ represent the first, second ... and nth derivative operators.

2. A method for controlling a process, said process being effected by a plant responsive to a control signal applied thereto and generating a plant output signal in accordance with a predetermined plant transfer function, said method comprising the steps of:

generating an error signal from said plant output signal and a reference signal, said error signal being indicative of deviations from said plant output signal from said reference signal;

generating from said error signal respective proportional and successive order derivative output signals in accordance with a predetermined model transfer function; and generating, in accordance with a second predetermined transfer function, inverse from said plant transfer function, said control signal from said aforementioned proportional and successive order derivative output signals, said control signals being of the form $k_0 + k_1 p + k_2 p^2 + \ldots k_n p^n$, where $p, p^2 \ldots p^n$ represents the first, second ... and nth derivative output signals; and adjusting said predetermined model transfer function to define desired response time and overshoot for said plant.

3. The method of claim 2 wherein said predetermined model transfer function $m_0$ of (p) is equal to $\omega_0^2/p(p+2z\omega_0)$, where p represents the first derivative and $\omega_0$ and z are adjustable parameters defining the desired response time and overshoot.

4. The system of claim 1 further comprising a delay circuit responsive to said model means proportional output signal, and means for adding said delayed signal to said error signal for application to said model means.

5. The method of claim 2 further comprising the step of delaying said proportional signal in accordance with $1 - e^{-\tau p}$, and adding said delayed signal to said error signal.

6. The method of claims 2 or 5 further comprising the steps of generating a second error signal indicative of deviations of said plant output signal from said model signal; and varying the coefficients $k_0, k_1, k_2 \ldots k_n$ of said inverse transfer function in accordance with said second error signal.

7. The method of claim 6 adapted for a process including a dead time, further including the step of delaying said proportional output signal in accordance with $1 - e^{-\tau p}$; and said adjusting of coefficient step includes applying said proportional and successive ordered derivative signals to respective delay circuits.

8. A control method according to claim 7 further comprising the step of adapting the delay circuits through an auto-adaptative algorithm.

9. The system of claim 1 wherein said corrector means comprises respective adjustable multipliers responsive to said proportional and successive order derivative output signals, and an adder receptive of the multiplier output signals, for generating said control signal.

10. The system of claim 9 wherein said corrector means further comprises means for generating a second error signal indicative of the difference between said plant output signal and said model means output signals;

respective second multipliers responsive to said second error signals and said model means output signals, for generating respective product signals; and respective integrators responsive to said respective product signals, for developing multiplication factor signals for application to said adjustable multipliers in said corrector means.

11. The system of claim 10 adapted for a process including a dead time, further comprising:

a first delay circuit responsive to said model means proportional output signal for delaying said proportional signal in accordance with $1 - e^{-\tau}/p$, said delayed signal being fed back as an input signal to said model means and second delay circuits responsive to said respective model means output signals, for providing respective delayed signals for application to said second multipliers.

12. The system of claim 10 wherein said model means comprises:

a first $\omega_0$ multiplier, responsive to said error signals;

an adder for summing output signals from said first $\omega_0$ multiplier with a 2z feedback signal applied thereto;

a second $\omega_0$ multiplier, responsive to the output signal of said adder;

a first integrator responsive to the output signal of said second $\omega_0$ multiplier;

an amplifier responsive to the output signal of said first integrator;

a 2z-multiplier responsive to the output signals from said amplifier, for generating said 2z feedback signal to said adder;

a second integrator responsive to said amplifier output signal;

whereby said second integrator output signal generates said model means proportional output signal, said first integrator output signal provides said model means first order derivative signal and the output of said second multiplier provides said model means second order derivative output signal.

13. The system of claim 1 wherein said model means comprises:

a first $\omega_0$ multiplier, responsive to said error signals;

an adder for summing output signals from said first $\omega_0$ multiplier with a 2z feedback signal applied thereto;

a second $\omega_0$ multiplier, responsive to the output signal of said adder;

a first integrator responsive to the output signal of said second $\omega_0$ multiplier;

an amplifier responsive to the output signal of said first integrator;

a 2z-multiplier responsive to the output signals from said amplifier, for generating said 2z feedback signal to said adder;

a second integrator responsive to said amplifier output signal;

whereby said second integrator output signal generates said model means proportional output signal, said first integrator output signal provides said model means first order derivative signal and the output of said second multiplier provides said model means second order derivative output signal.

14. The system of claim 13 wherein said corrector means comprises:

first, second and third multipliers responsive to said model means proportional, first derivative, and second derivative output signals and to respective variable multiplier signals applied respectively thereto;

means for summing the output signals of said first, second and third multipliers for generating said control signal to said plant;

a subtractor responsive to said plant output signal and a signal indicative of said model means proportional output signal for generating a second error signal;

fourth, fifth and sixth multipliers responsive to said second error signal and respectively responsive to signals indicative of said proportional, first derivative, and second derivative model means output signals; and respective integrators responsive to the respective output signals of said fourth, fifth and sixth multipliers for generating said variable multiplier signals to said first, second and third multipliers.

* * * * *